United States Patent [19]

Rocha et al.

[11] Patent Number: 5,035,672
[45] Date of Patent: Jul. 30, 1991

[54] MEAT PREPARATION MACHINE

[75] Inventors: Joaquim Rocha; Jose Daniel, both of Mississauga, Canada

[73] Assignee: Danro Tool Company Inc., Ontario, Canada

[21] Appl. No.: 484,908

[22] Filed: Feb. 26, 1990

[51] Int. Cl.⁵ .............................................. A22C 9/00
[52] U.S. Cl. ..................................... 452/141; 452/144
[58] Field of Search ................................ 452/141, 144

[56] References Cited

U.S. PATENT DOCUMENTS

| | | | |
|---|---|---|---|
| 1,116,668 | 11/1914 | Barringer | 452/144 |
| 1,208,953 | 12/1916 | Gregoire | 452/144 |
| 3,413,681 | 12/1968 | Manaster | 452/144 |
| 3,727,267 | 4/1973 | Clark | 452/141 |
| 4,027,356 | 6/1977 | Wagner et al. | 452/141 |
| 4,186,462 | 2/1980 | Bettcher | 452/141 |
| 4,205,414 | 6/1980 | Ueno et al. | 452/141 |

*Primary Examiner*—Willis Little
*Attorney, Agent, or Firm*—Wegner, Cantor, Mueller & Player

[57] ABSTRACT

A meat tenderizing machine having a press plate with teeth on a lower surface thereof for effecting tenderization of a cut of meat. This plate extends parallel to an upper surface of a meat supporting mechanism. There are power means for reciprocating a press plate towards and away from the support mechanism. This reciprocating means can be adjusted in order to adjust the reciprocal movement of the press plate and thus the distance between the lower surface of the press plate and the upper surface of the meat support mechanism when the press plate is in a fully lowered position. Preferably the reciprocating means is a plunger connected to the press plate, a guide for the plunger, a crank shaft rotatably mounted on a support structure, and a connecting rod pivotally connected to the crank shaft and the plunger.

20 Claims, 5 Drawing Sheets

MEAT PREPARATION MACHINE

BACKGROUND OF THE INVENTION

This invention relates to meat tenderizing machines.

It is a well known practice to tenderize a cut of meat by striking it repeatedly with a suitable hammer device. However, this can be a very tiring and tedious operation when it is carried out manually, particularly if there are a large number of cuts to be tenderized. Various machines have been developed in the past for tenderizing meat cuts, some of these machines employing a series of knives which subject the meat to a number of small cuts in order to tenderize same while others employ a form of press plate that is reciprocated in order to strike the meat and thereby tenderize same. Many of the known machines, particularly those employing a number of knives, are believed to be quite expensive and not particularly suitable for certain cuts of meat.

U.S. Pat. No. 3,413,681 issued Dec. 3, 1968 to J. Manaster describes a machine for flattening poultry meat which includes a conveyor belt and a vertically movable press member. There are a plurality of rigid plate members arranged along the conveyor and on these members the chicken sections are placed. The portion of the conveyor located below the press is supported by a rigid plate. The press member has a press plate with a serrated bottom surface and is air actuated. There appear to be no means for adjusting the downward movement of the press plate in this machine in order to accommodate poultry sections of different thicknesses. This known machine appears to rely upon the use of an air cylinder to actuate the press plate in order to prevent the piece of chicken from being crushed.

More recent U.S. Pat. No. 4,205,414 which issued Jun. 3, 1980 to Kureha Kagaku Kogyo Kabushiki Kaisha describes a reciprocating type tenderizer driven by a rotary crank to enable higher operating speeds. A conveyor used to transport the meat cuts has its upper surface positioned within 1-2 mm of the bottom dead center position of the cutting edges to provide good penetration. There appears to be no provision in this known tenderizing machine for adjusting the depth of penetration of the cutting edges.

It is an object of the present invention to provide a novel meat tenderizing machine employing a reciprocally mounted tenderizing tool and means for reciprocating this tool wherein the reciprocating means can be adjusted in order to adjust the reciprocal movement of the tool. In this way, the machine can be easily adjusted to accommodate meat cuts of various thicknesses.

It is a further object of the present invention to provide a meat tenderizing machine that can be constructed at a reasonable cost and that will operate quickly and efficiently to tenderize a large number of meat cuts.

SUMMARY OF THE INVENTION

According to one aspect of the invention, a meat tenderizing machine comprises a conveyor forming a cut of meat supporting surface adapted to transport and support the cut of meat during operation of the machine and a meat tenderizing tool reciprocally mounted above the supporting surface for affecting tenderization of the cut of meat. This tool is movable generally in a vertical direction to a fully lowered position. There are also means for reciprocating the tool in a generally vertical direction towards and away from said supporting surface and a mechanism for adjusting the reciprocating means and thereby the reciprocal movement of the tool in order that the distance between the lowermost point of the tool and the supporting surface in the fully lowered position is a desired distance.

In a particular preferred embodiment, the reciprocating means includes a plunger connected to the tool, a guide for the reciprocal movement of the plunger, a crank shaft rotatably mounted on a supporting structure and a connecting rod pivotally connected at opposite ends to the crank shaft and the plunger.

According to a further aspect of the invention, a meat tenderizing machine includes a meat supporting mechanism for supporting a cut of meat during operation of the machine and a press plate having teeth on a lower surface thereof for affecting tenderization of the cut of meat, this plate extending parallel to an upper surface of the meat supporting mechanism. There is also a mechanism for reciprocating the press plate towards and away from the support mechanism and a device for adjusting the reciprocating mechanism and thereby the reciprocal movement of the press plate in order that the distance between the lower surface of the press plate and the upper surface of the meat supporting mechanism when the press plate is in a fully lowered position is a desired distance.

Further features and advantages will become apparent from the following detailed description taken in conjunction with the accompanying drawings.

DETAILED DESCRIPTION OF PREFERRED EMBODIMENT

Figure 1:
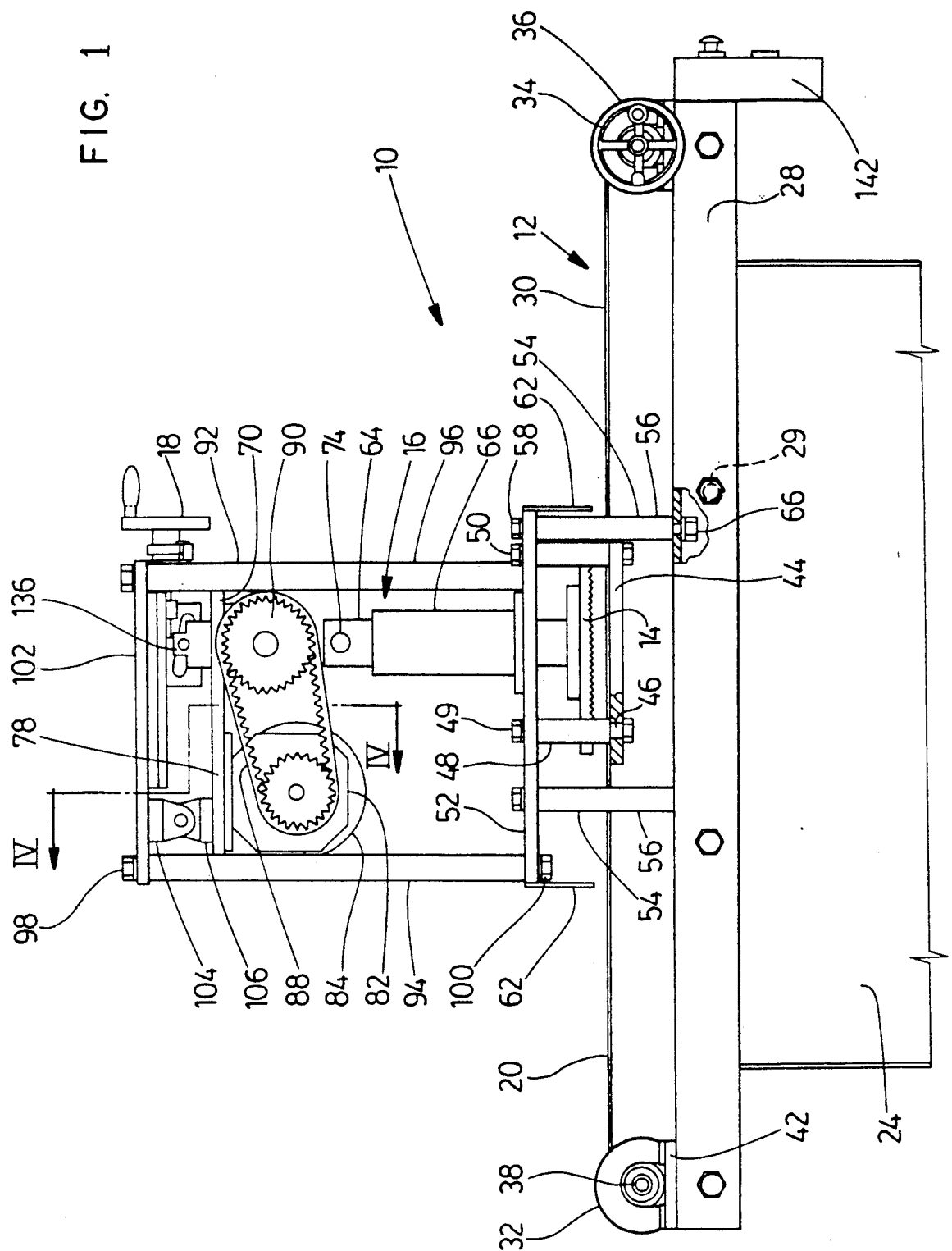
FIG. 1 is a side elevation of a meat tenderizing machine constructed in accordance with the invention.
Figure 2:
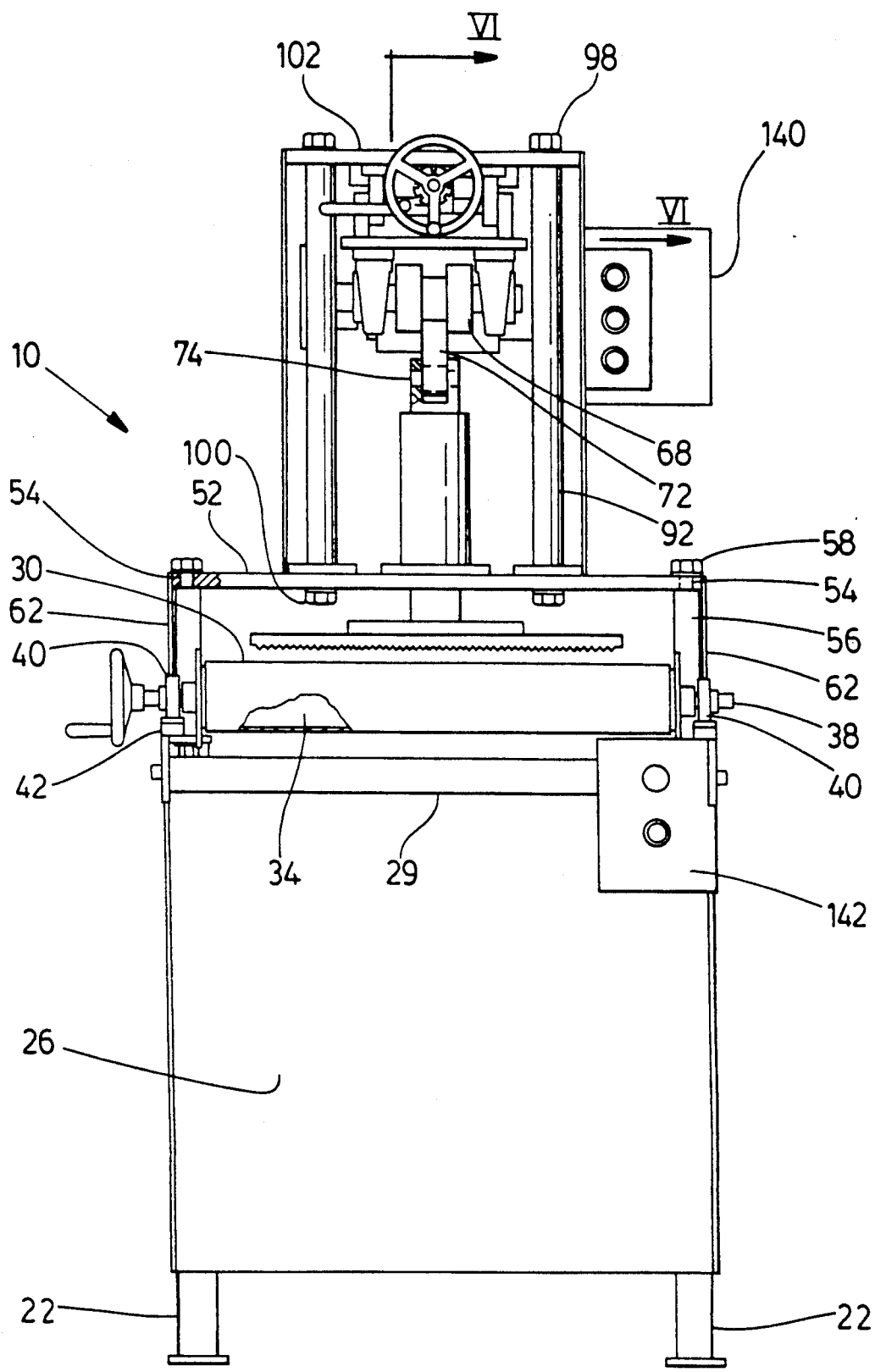
FIG. 2 is an end elevation of the machine of FIG. 1.
Figure 3:
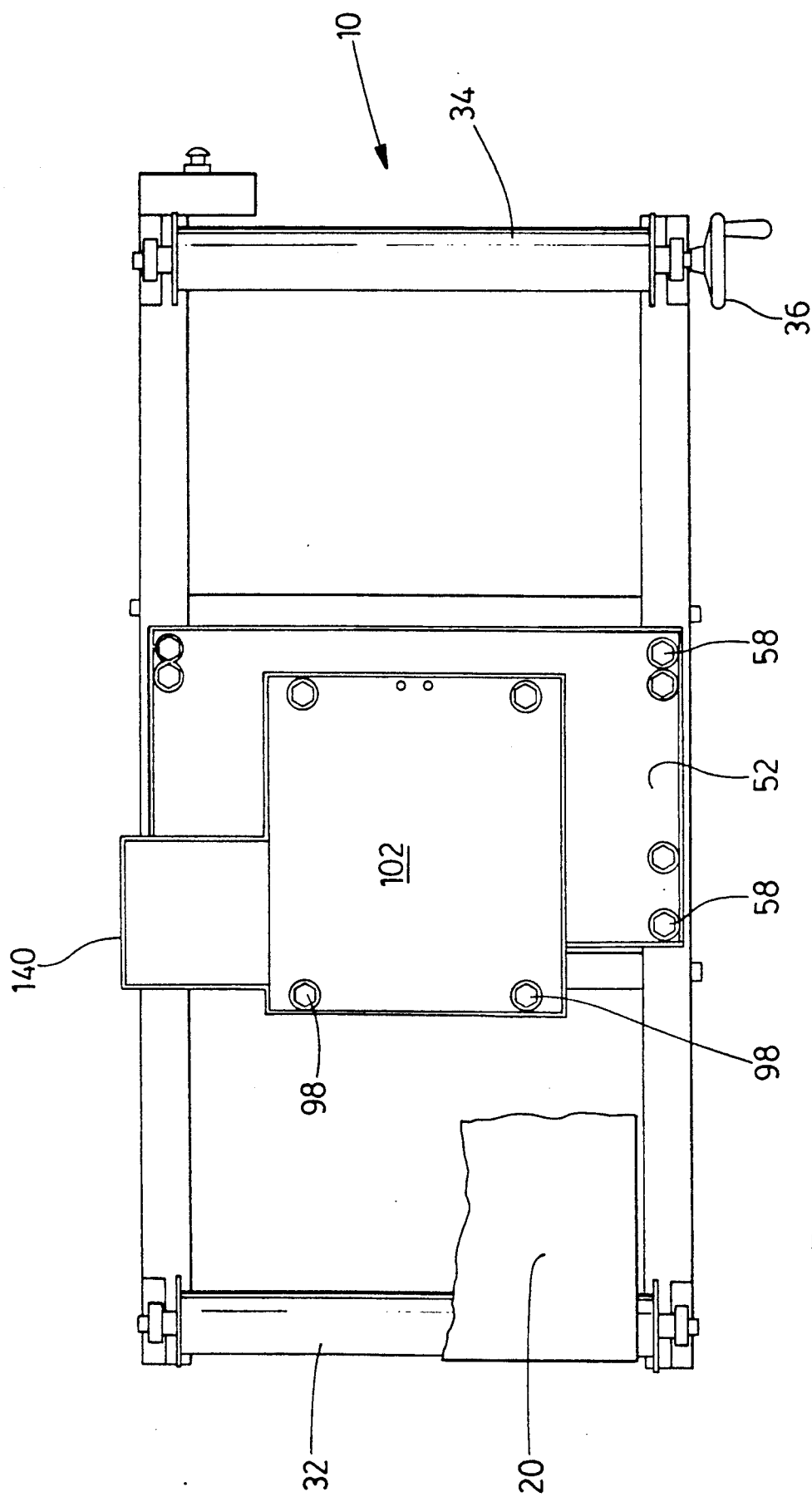
FIG. 3 is a plan view of the meat tenderizing machine of FIG. 1.

A complete meat tenderizing machine 10 constructed in accordance with the invention is shown in FIGS. 1 to 3 of the drawings. This machine comprises several main components including meat supporting means indicated generally at 12 for supporting a cut of meat during operation of the machine, a press plate 14 which acts as the tenderizing tool, means for reciprocating the press plate towards and away from the support means 12, and means for adjusting the reciprocating means and thereby the reciprocal movement of the press plate. The reciprocating means are indicated generally at 16 while the adjusting means is indicated generally at 18.

The preferred meat supporting means 12 will now be described in detail with reference to FIGS. 1 to 3. Preferably the supporting means includes a conveyor 20 whose upper surface can be used to support a number of cuts of meat which can be transported to a position below the press plate 14 during operation of the machine. The conveyor is mounted on four upright legs 22 which are connected together by two side base plates 24 and by two end base plates 26. Rigidly mounted at the top of the legs are two horizontal bed rails 28 which extend the length of the conveyor. The rails 28 are connected together by four connecting tube members 29 spaced along the length of the rails.

The conveyor 20 is made with a continuous strip of flexible material indicated at 30. In one preferred embodiment of the machine, the material is type number FNB8E sold by Habasit Canada Limited. This preferred form of conveyor belt is suitable for use with food products and can be readily cleaned. The belt extends around two rotatable conveyor drums 32 and 34 mounted at opposite ends of the bed rails 28. In the illustrated machine, the conveyor drum 34 can be rotated manually by means of a hand wheel 36 which provides means for moving the belt 30 as required to transport the meat cuts. Each conveyor drum is mounted on a horizontal shaft 38 and the hand wheel is connected to one of these shafts as shown in FIG. 2. Each shaft is mounted in two bearings 40 located near opposite ends of the shaft. These bearings are mounted on spacers 42.

Arranged immediately below a center section of the upper portion of the belt 30 is a platen or support plate 44. This provides the necessary support for the cut of meat being tenderized under the press plate 14. The platen 44 is supported by relatively short tie rods 46 which extend through spacer sleeves 48. The tie rods 46 are threaded at each end to receive nuts 49 and 50. The tie rods 46 connect the platen 44 to a horizontal base plate 52. The base plate 52 is in turn supported at an elevated position above the conveyor belt by means of supporting tie rods 54. Again, spacer sleeves 56 are arranged on each of these tie rods. The tie rods 54 are connected to the base plate 52 by nuts 58 and are connected to the bed rails 28 by nuts 60. Located at opposite ends of and on opposite sides of the base plate 52 are suitable belt guards 62 which help to prevent the hands of a user from going underneath the press plate. Preferably the belt guards are made from clear plastic so that the position of and operation of the press plate can be viewed.

Turning now to the preferred construction for the reciprocating means 16, these means include an elongate plunger 64 and a plunger guide 66, both made of stainless steel. The guide permits reciprocal movement of the plunger in a generally vertical direction. There is also a crankshaft 68 rotatably mounted on a supporting structure indicated generally at 70 and a connecting rod 72 pivotally connected at opposite ends to the crankshaft and the plunger. Preferably a bearing 71 rotatably connects the top of rod 72 to the crankshaft. A wrist pin 74 connects the rod 72 to the plunger. In a known manner the wrist pin is preferably mounted in a suitable bearing and is held in place by a retaining ring.

Figure 4:
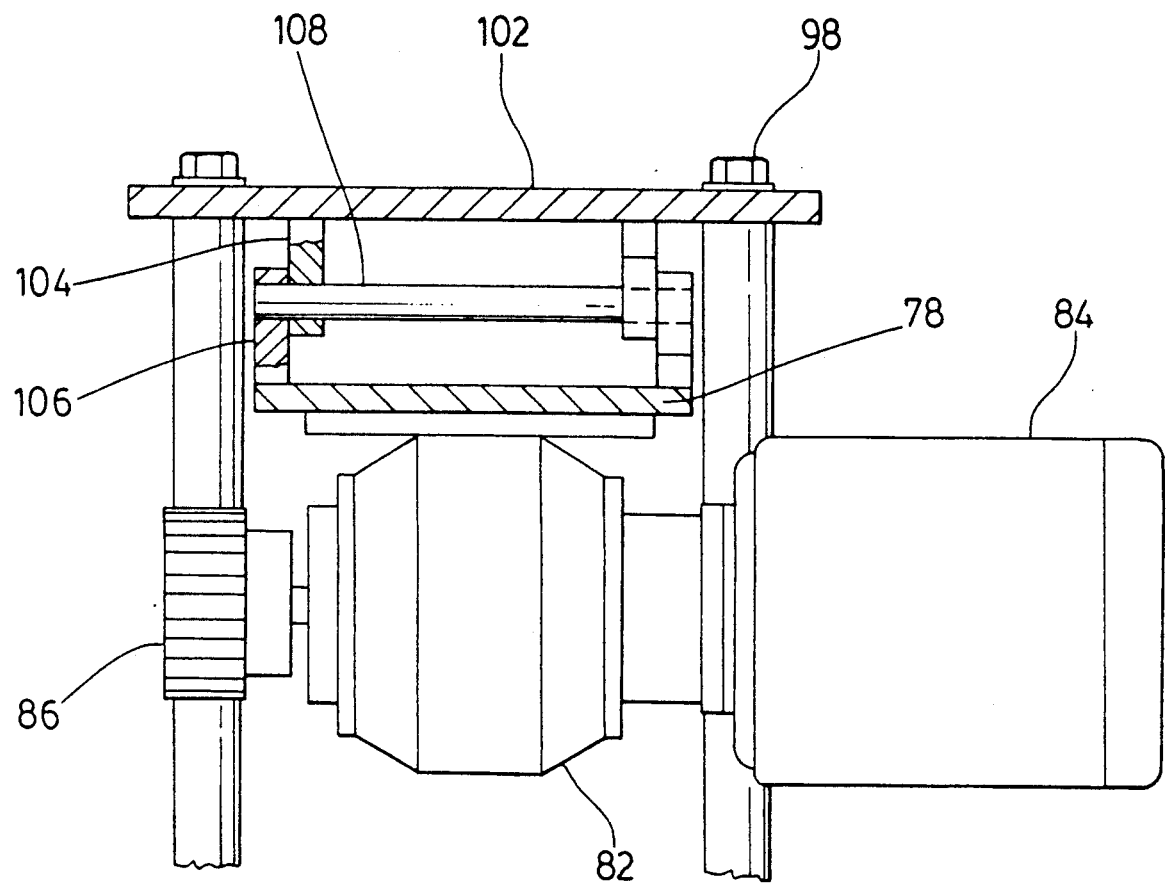
FIG. 4 is a cross-sectional elevation taken along the line IV—IV of FIG. 1.

In the illustrated preferred embodiment, the supporting structure 70 for the crankshaft includes a pivotable plate 78 on the bottom surface of which are mounted two pillow blocks 80. Also mounted on the bottom of this plate is a gear reducer 82 and an electric motor 84 which in a preferred embodiment is a 1.5 horsepower helical gear motor. As shown in FIG. 4, the output shaft of the gear reducer is connected to a timing sprocket 86. This sprocket is connected by a timing belt 88 to a driving timing sprocket 90 which in turn is connected to the aforementioned crank shaft 68. The two timing sprockets are mounted in suitable bushings. It will thus be understood that operation of the electric motor 84 will turn the timing belt which in turn will operate the crankshaft and thus reciprocate the plunger.

The supporting structure for the pivoting plate 78 will now be described with reference to FIGS. 1, 2 and 4. Extending upwardly from the base plate 52 are long front and rear tie rods 92 and 94. These tie rods extend through long spacer members 96. The rods are threaded at opposite ends to receive nuts 98 and 100. The nuts 98 connect the tie rods to a top plate 102 while the nuts 100 connect the tie rods to the base plate 52. Preferably all these supporting members are made from stainless steel. Mounted to the bottom of the plate 102 are two upper hinge blocks 104. Extending upwardly from the pivoting plate 78 and connected thereto are two further hinge blocks 106. The blocks 104 and 106 are pivotally connected by an elongate hinge pin 108 which can be seen clearly in FIG. 4.

Figure 5:
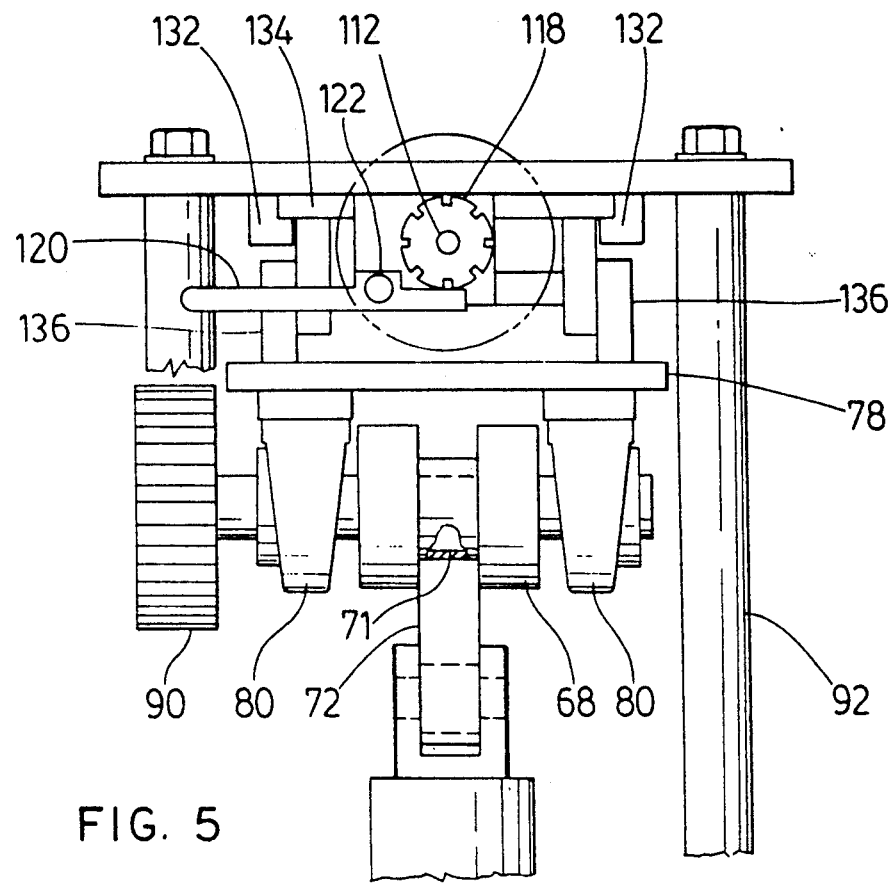
FIG. 5 is a detail elevation taken from the view point of FIG. 2 and showing certain details of the upper portion of the machine.
Figure 6:
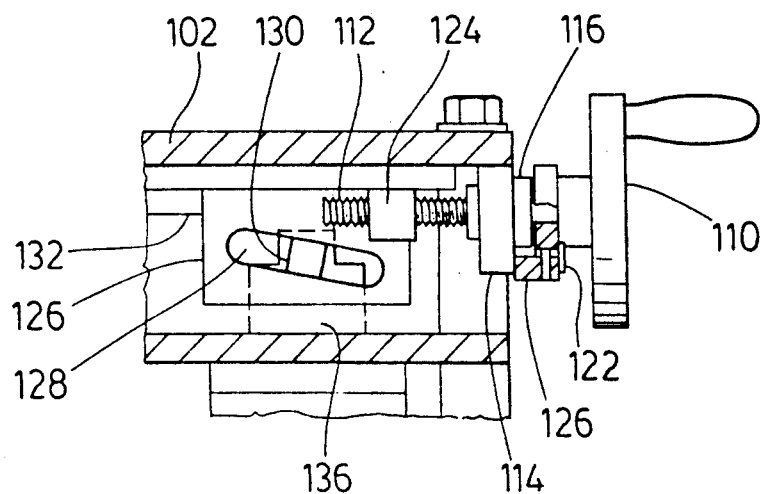
FIG. 6 is a cross-sectional elevation taken along the line VI—VI of FIG. 2.

The mechanism for adjusting the reciprocating means 16 will now be described with particular reference to FIGS. 5 and 6. The adjusting means 18 is operated by a hand wheel 110 which is connected to rotate a threaded adjusting screw 112 that vertically adjusts or pivots the aforementioned plate 78. The screw 112 extends through and is guided by a guide member 114 rigidly mounted to the bottom of the top plate 102. Arranged on the outside of the member 114 is an adjustable collar 116. Arranged next to this collar and fixedly mounted on the screw is a circular ratchet 118 having a number of notches distributed about its circumference. This ratchet is normally engaged by a manually operated height adjusting pawl 120 shown clearly in FIG. 5. The pawl is pivotally mounted by means of pin 122. It will thus be appreciated that upon lifting the outer end of the pawl 120, it is disengaged from the ratchet thus permitting rotation of the adjusting screw 112.

The adjusting nut 112 engages an adjusting nut 124 which is connected to two slide plates 126, each of which has cut therein an elongate, sloping slot 128. Arranged in both slots is an adjusting member 130 which is connected to the pivotable plate 78. The top edges of the plates 126 are connected to a sliding horizontal plate 134, the side edges of which are held by two plate guides 132 affixed to the bottom of the top plate 102. The aforementioned member 130 is connected to the pivoting plate 78 by two bearing blocks 136 having holes to receive the ends of the member 130. It will be appreciated that because of the slope of the slots 128, the turning of the screw 112 will cause the member 130 to be either raised or lowered, thereby raising or lowering the plate 78. In this way, the maximum downward movement of the plunger and the attached press plate 14 can be easily adjusted.

Preferably the motor 84 is enclosed by a stainless steel guard or housing 140.

The machine can be turned on or off by push buttons mounted in a control box 142. The control box preferably includes an emergency stop button and a momentary on button.

Because this machine is used to process food, most of the metal parts are made from either stainless steel, as indicated, or anodized aluminum. Aluminum parts can include the conveyor drums 32, the drum shafts and bearing spacers. Also the side and end base plates 24 and 26 can be aluminum as well as the legs 22.

It will be appreciated that the same operator of the machine can use both of the hand wheels including hand wheel 36 used to operate the conveyor and the hand wheel used to adjust the downward movement of the press plate. Moreover, with the use of clear plastic viewing windows around all four sides of the press plate, it is easy for the user to determine the existing stage of downward movement of the press plate and whether or not an adjustment in this downward movement must be made for the particular cuts of meat being processed.

It will be obvious to those skilled in this art that various modifications and changes can be made to the described meat preparing machine without departing from the spirit and scope of this invention. Accordingly, all such modifications and changes as fall within the scope of the appended claims are intended to be part of this invention.

We therefore claim:

1. A meat tenderizing machine comprising:
   meat support means for supporting a cut of meat during operation of the machine,
   a press plate having teeth on a lower surface thereof for affecting tenderization of the cut of meat, said plate extending parallel to an upper surface of said meat support means,
   means for reciprocating said press plate towards and away from said support means, and
   means for adjusting said reciprocating means and thereby the reciprocal movement of said press plate in order that the distance between said lower surface of said press plate and said upper surface of said meat support means when the press plate is in a fully lowered position is a desired distance.

2. A machine according to claim 1 wherein said reciprocating means comprise a plunger connected to said press plate, means for guiding reciprocal movement of said plunger, a crankshaft rotatably mounted on a supporting structure, and a connecting rod pivotably connected at opposite ends to said crankshaft and said plunger.

3. A machine according to claim 2 wherein said support structure for said crankshaft includes a movable support member and said adjusting means comprises means for moving said support member and thereby said crankshaft.

4. A machine according to claim 3 wherein said support member is a pivotable plate on the bottom surface of which are mounted pillow blocks for said crankshaft and said moving means includes an elongate threaded shaft, a movable adjusting nut through which said shaft extends, slot means mounted above said plate and having an elongate slot formed therein and extending at an acute angle to said pivotable plate, an adjusting member mounted in said slot means and connected to said pivotable plate, wherein movement of said nut by said threaded shaft slides said slot means and said slot and thereby pivots said plate.

5. A machine according to claim 4 including a handwheel connected to an end of said threaded shaft for manually rotating said shaft.

6. A machine according to claim 4 including means for locking said threaded shaft in a desired position so as to prevent rotation thereof.

7. A machine according to claim 4 including a ratchet fixedly mounted on said threaded shaft and a pivotably mounted pawl positioned to engage said ratchet, said ratchet and pawl together providing a mechanism for locking said threaded shaft in a desired position.

8. A machine according to claim 2 including a motor for rotating said crankshaft and a gear reducer driven by said motor and operatively connected to said crankshaft.

9. A machine according to claim 8 wherein said support structure for said crankshaft includes a pivotable support member on which are also mounted said gear reducer and motor and said adjusting means comprises means for moving said support member and thereby said crankshaft.

10. A machine according to claim 9 including a first timing sprocket connected to said crankshaft, a second timing sprocket connected to said gear reducer, and a continuous belt extending around and connecting the two timing sprockets.

11. A meat tenderizing machine comprising:
    conveyor means forming a cut of meat supporting surface adapted to transport and support said cut of meat during operation of the machine,
    a meat tenderizing tool reciprocally mounted above said supporting surface for affecting tenderization of the cut of meat, said tool being movable generally in a vertical direction to a fully lowered position,
    means for reciprocating said tool in a generally vertical direction towards and away from said supporting surface, and
    means for adjusting said reciprocating means and thereby the reciprocal movement of said tool in order that the distance between lowermost points of said tool and said supporting surface in said fully lowered position is a desired distance.

12. A machine according to claim 11 wherein said reciprocating means comprises a plunger connected to said tool, means for guiding reciprocal movement of such plunger, a crankshaft rotatably mounted on a supporting structure, and a connecting rod pivotably connected at opposite ends to said crankshaft and said plunger.

13. A machine according to claim 12 wherein said support structure for said crankshaft includes a movable support member and said adjusting means comprises means for moving said support member and thereby said crankshaft.

14. A machine according to claim 13 wherein said support member is a pivotable plate on the bottom surface of which are mounted pillow blocks for said crankshaft and said moving means includes an elongate threaded shaft, a movable adjusting nut through which said shaft extends, slot means mounted above said plate and having an elongate slot formed therein and extending at an acute angle to said pivotable plate, an adjusting member mounted in said slot means and connected to said pivotable plate, wherein movement of said nut by said threaded shaft slides said slot means and said slot and thereby pivots said plate.

15. A machine according to claim 14 including a handwheel connected to an end of said threaded shaft for manually rotating said shaft.

16. A machine according to claim 14 including means for locking said threaded shaft in a desired position so as to prevent rotation thereof.

17. A machine according to claim 14 including a ratchet fixedly mounted on said threaded shaft and a pivotably mounted pawl positioned to engage said ratchet, said ratchet and pawl together providing a mechanism for locking said threaded shaft in a desired position.

18. A machine according to claim 12 including a motor for rotating said crankshaft and a gear reducer driven by said motor and operatively connected to said crankshaft.

19. A machine according to claim 18 wherein said support structure for said crankshaft includes a pivotable support member on which are also mounted said gear reducer and motor and said adjusting means comprising means for moving said support member and thereby said crankshaft.

20. A meat tenderizing machine comprising meat supporting means for supporting a cut of meat during operation of the machine;

a meat tenderizing tool reciprocally mounted above a meat supporting surface of said supporting means, said tool being movable generally in a vertical direction to a fully lowered position;

means for reciprocating said tool in a generally vertical direction towards and away from said supporting surface, and means for adjusting said reciprocating means and thereby the reciprocal movement of said tool in order that the distance between lowermost points of said tool and said supporting surface in said fully lowered position is a desired distance.

* * * * *